(12) United States Patent
Okumura (10) Patent No.: US 8,254,230 B2
(45) Date of Patent: *Aug. 28, 2012

(54) RECORDING APPARATUS AND METHOD, AND RECORDING MEDIUM AND PROGRAM USED THEREWITH

(75) Inventor: Atsushi Okumura, Tokyo (JP)

(73) Assignee: Sony Corporation, Tokyo (JP)

( * ) Notice: Subject to any disclaimer, the term of this patent is extended or adjusted under 35 U.S.C. 154(b) by 194 days.

This patent is subject to a terminal disclaimer.

(21) Appl. No.: 12/269,841

(22) Filed: Nov. 12, 2008

(65) Prior Publication Data
US 2009/0073819 A1    Mar. 19, 2009

Related U.S. Application Data

(63) Continuation of application No. 11/217,375, filed on Sep. 2, 2005, now Pat. No. 7,477,579.

(30) Foreign Application Priority Data

Sep. 6, 2004    (JP) ............................... P2004-258639

(51) Int. Cl.
*G11B 7/00* (2006.01)
(52) U.S. Cl. .................................. 369/53.1; 369/53.22
(58) Field of Classification Search ............... 369/53.41, 369/47.1, 47.27, 53.21, 53.22, 53.1, 59.25, 369/47.21, 275.3, 44.26
See application file for complete search history.

(56) References Cited

U.S. PATENT DOCUMENTS

| | | | | |
|---|---|---|---|---|
| 6,778,479 B2* | 8/2004 | Weng | .......................... | 369/47.55 |
| 6,826,139 B1* | 11/2004 | Oh et al. | ..................... | 369/53.37 |
| 6,876,612 B2 | 4/2005 | Yoneyama et al. | | |
| 6,930,967 B2* | 8/2005 | Suzuki et al. | .............. | 369/53.41 |
| 7,102,989 B2* | 9/2006 | Suh et al. | ................... | 369/275.3 |
| 7,149,164 B2* | 12/2006 | Tsukihashi et al. | ........ | 369/47.24 |
| 7,599,259 B2* | 10/2009 | Oishi et al. | ................... | 369/47.1 |

FOREIGN PATENT DOCUMENTS

| | | |
|---|---|---|
| JP | 2002-373418 | 12/2002 |
| JP | 2002-373423 | 12/2002 |
| JP | 2003-016640 | 1/2003 |
| JP | 2003-085944 | 3/2003 |
| JP | 2003-132630 | 5/2003 |
| JP | 2004-206824 | 7/2004 |
| JP | 2005-165454 | 6/2005 |
| JP | 2006-040369 | 2/2006 |
| KR | 2003-3396 | 1/2003 |

\* cited by examiner

*Primary Examiner* — Nabil Z Hindi (74) *Attorney, Agent, or Firm* — Finnegan, Henderson, Farabow, Garrett & Dunner, L.L.P.

(57) ABSTRACT

A recording apparatus includes an acquiring unit for acquiring, from an optical disc, disc-state information including at least information of an optical disc type, information of a recording format, and information indicating whether the optical disc has already been finalized, a first determining unit for determining, based on the information of the optical disc type and the information of the recording format in the acquired information, whether the optical disc type and the recording format correspond to one of predetermined combinations, a second determining unit for determining, based on the result of determination by the first determining unit and the acquired information, whether the optical disc needs to be finalized, and a display control unit for controlling, when the second determining unit determines that the optical disc needs to be finalized, display of a message representing the need of the finalization.

11 Claims, 8 Drawing Sheets

| | DVD-R | DVD-RW | DVD + RW |
|---|---|---|---|
| DVD-Video | UNFINALIZED | UNFINALIZED/ DE-FINALIZED | — |
| DVD-VR | — | UNFINALIZED | — |
| DVD + RW Video | — | — | UNFINALIZED/ FINALIZED NO DVD MENU |

|  | DVD-R | DVD-RW | DVD+RW |
|---|---|---|---|
| DVD-Video | UNFINALIZED | UNFINALIZED/ DE-FINALIZED | — |
| DVD-VR | — | UNFINALIZED | — |
| DVD+RW Video | — | — | UNFINALIZED/ FINALIZED NO DVD MENU |

RECORDING APPARATUS AND METHOD, AND RECORDING MEDIUM AND PROGRAM USED THEREWITH

CROSS REFERENCES TO RELATED APPLICATIONS

This is a continuation of application Ser. No. 11/217,375 (Now U.S. Pat. No. 7,477,579), filed Sep. 2, 2005, which claims the benefit of priority to Japanese Application No. JP 2004-258639, filed Sep. 6, 2004, all of which are incorporated herein by reference.

BACKGROUND OF THE INVENTION

1. Field of the Invention

The present invention relates to recording apparatuses and methods, and recording media and programs used therewith, and in particular to a recording apparatus and method for displaying messages concerning finalization, and to a recording medium and program used with the apparatus and method.

2. Description of the Related Art

Recently, recording/playback apparatuses are in widespread use, such as digital camcorders and DVD (digital versatile disc) recorders which record various types of data, such as images and audio, on optical discs such as compact discs (CDs) and DVDs, and which play back various types of data recorded on optical discs. In order to perform recording to or playback from an optical disc having various types of data recorded with a recording/playback apparatus by using another recording/playback apparatus, finalization (final processing on recorded information), such as session closing or border closing, may be needed.

In many cases, finalization (processing) takes time. Accordingly, to meet the need of a user to unload an optical disc as quickly as possible for the purpose of disc exchange, there is a recording/playback apparatus in which an optical disc can be unloaded without performing finalization.

There is an information recording apparatus (see, for example, Japanese Unexamined Patent Application Publication No. 2003-132630) having simplified finalization in which a finalization time is reduced. In this information recording apparatus, for guaranteeing that a recording medium having finalized information is played back by a playback apparatus, additional recording can be performed so that the simplified finalization is equivalent to normal finalization.

In addition, there is another recording apparatus (see, for example, Japanese Unexamined Patent Application Publication No. 2002-373423) which, when a DVD-R unloading command is input, requests a user to select whether to perform finalization recording, and performs finalization recording in response to the result of selection before executing unloading of the DVD-R. Furthermore, in another recording apparatus (see, for example, Japanese Unexamined Patent Application Publication No. 2002-373418), when a DVD-R unloading command is input, finalization recording is performed before unloading of the DVD-R is executed.

SUMMARY OF THE INVENTION

However, unloading of an optical disc without performing finalization causes a case in which it is difficult for another recording/playback apparatus to perform recording to or playback from the optical disc.

In addition, in the apparatus disclosed in, for example, Japanese Unexamined Patent Application Publication No. 2003-132630, 2002-373423, or 2002-373418, it is difficult to display messages corresponding to combinations of optical disc types and recording formats. Accordingly, the user is unable to know whether finalization is needed.

It is desirable to display predetermined messages corresponding to combinations of types of unfinalized optical discs and recording formats, whereby a user is urged to execute finalization on the optical disc.

According to an embodiment of the present invention, there is provided a recording apparatus for recording data on an optical disc, including an acquiring means which, from the optical disc, acquires optical-disc-state information including at least information of the type of the optical disc, information of a recording format, and information indicating whether or not the optical disc has already been finalized, a first determining means which, based on the information of the type of the optical disc and the information of the recording format in the optical-disc-state information acquired by the acquiring means, determines whether or not the type of the optical disc and the recording format correspond to one of predetermined combinations, a second determining means which, based on the result of determination by the first determining means and the optical-disc-state information acquired by the acquiring means, determines whether or not the optical disc needs to be finalized, and a display control means which, when the second determining means determines that the optical disc needs to be finalized, controls display of a message representing the need of the finalization.

Based on the information of the type of the optical disc in the optical-disc-state information acquired by the acquiring means, the first determining means may determine whether the type of the optical disc is one of predetermined types, and, when determining that the type of the optical disc is the one of the predetermined types, the first determining means may determine whether or not the type of the optical disc and the recording format correspond to the one of the predetermined combinations.

The first determining means may determine whether or not the type of the optical disc is one of DVD-R (Digital Versatile Disc Specifications for Recordable Disc), DVD-RW (DVD Specifications for Re-recordable Disc), and DVD+RW (DVD Specifications for +ReWritable Disc) which are the predetermined types.

The second determining means may determine whether or not the one of the predetermined combinations is one of a combination of DVD-R and the DVD-Video format, a combination of DVD-RW and the DVD-Video format, a combination of DVD-RW and the DVD-VR format, and a combination of DVD+RW and the DVD+RW Video format.

Based on the result of determination by the second determining means, when the optical disc needs to be finalized, the display control means may control display of a button for instructing the recording apparatus to execute the finalization.

The finalization may be one of session closing and border closing.

According to an embodiment of the present invention, there is provided a recording method for a recording apparatus which records data on an optical disc, the recording method including the steps of acquiring, from the optical disc, optical-disc-state information including at least information of the type of the optical disc, information of a recording format, and information indicating whether or not the optical disc is finalized, firstly determining, based on the information of the type of the optical disc and the information of the recording format in the optical-disc-state information acquired in the acquiring step, whether or not the type of the optical disc and the recording format correspond to one of predetermined combinations, secondly determining, based on the result of determination in the firstly determining step and the optical-disc-state information acquired in the acquiring step, whether or not the optical disc needs to be finalized, and controlling display of a message representing the need of the finalization when it is determined that the optical disc needs to be finalized.

According to an embodiment of the present invention, there is provided a recording medium containing a program including the steps of acquiring, from the optical disc, optical-disc-state information including at least information of the type of the optical disc, information of a recording format, and information indicating whether or not the optical disc is finalized, firstly determining, based on the information of the type of the optical disc and the information of the recording format in the optical-disc-state information acquired in the acquiring step, whether or not the type of the optical disc and the recording format correspond to one of predetermined combinations, secondly determining, based on the result of determination in the firstly determining step and the optical-disc-state information acquired in the acquiring step, whether or not the optical disc needs to be finalized, and controlling display of a message representing the need of the finalization when it is determined that the optical disc needs to be finalized.

According to an embodiment of the present invention, there is provided a program including the steps of acquiring, from the optical disc, optical-disc-state information including at least information of the type of the optical disc, information of a recording format, and information indicating whether or not the optical disc is finalized, firstly determining, based on the information of the type of the optical disc and the information of the recording format in the optical-disc-state information acquired in the acquiring step, whether or not the type of the optical disc and the recording format correspond to one of predetermined combinations, secondly determining, based on the result of determination in the firstly determining step and the optical-disc-state information acquired in the acquiring step, whether or not the optical disc needs to be finalized, and controlling display of a message representing the need of the finalization when it is determined that the optical disc needs to be finalized.

In a recording apparatus and method, and recording medium and program according to embodiments of the present invention, from an optical disc, optical-disc-state information including at least information of the type of the optical disc, information of a recording format, and information indicating whether the optical disc has already been finalized is acquired, and, based on the information of the type of the optical disc and recording format in the acquired optical-disc-state information, it is determined whether or not the type of the optical disc and the recording format correspond to one of predetermined combinations. Based on the result of determination and the optical-disc-state information, it is determined whether or not the optical disc needs to be finalized, and, when it is determined that the optical disc needs to be finalized, display of a message representing the need of the finalization is controlled.

According to an embodiment of the present invention, the recording state of an optical disc can be known. In addition, according to another embodiment of the present invention, display of a message can urge a user to execute finalization on the optical disc.

DESCRIPTION OF THE PREFERRED EMBODIMENTS

According to an embodiment of the present invention, a recording apparatus is provided. This recording apparatus (e.g., the recording apparatus 1 shown in FIG. 1) includes an acquiring means (e.g., the disc-information acquiring section 31 shown in FIG. 1) which, from an optical disc (e.g., the optical disc 19 in FIG. 1), acquires optical-disc-state information including at least information of the type of the optical disc, information of a recording format, and information indicating whether or not the optical disc has already been finalized, a first determining means (e.g., the disc identifying section 32 shown in FIG. 1) which, based on the information of the type of the optical disc and the information of the recording format in the optical-disc-state information acquired by the acquiring means, determines whether or not the type of the optical disc and the recording format correspond to one of predetermined combinations, a second determining means (e.g., the finalization determining section 33 shown in FIG. 1) which, based on the result of determination by the first determining means and the optical-disc-state information acquired by the acquiring means, determines whether or not the optical disc needs to be finalized, a display control means (e.g., the message-display control section 34 shown in FIG. 1) which, when the second determining means determines that the optical disc needs to be finalized, controls display of a message representing the need of the finalization.

Based on the information of the type of the optical disc in the optical-disc-state information acquired by the acquiring means, the first determining means may determine whether the type of the optical disc is one of predetermined types, and, when determining that the type of the optical disc is the one of the predetermined types, the first determining means may determine whether or not the type of the optical disc and the recording format correspond to the one of the predetermined combinations.

The first determining means may determine whether or not the type of the optical disc is one of DVD-R (Digital Versatile Disc Specifications for Recordable Disc), DVD-RW (DVD Specifications for Re-recordable Disc), and DVD+RW (DVD Specifications for +ReWritable Disc) which are the predetermined types.

The second determining means may determine whether or not the one of the predetermined combinations is one of a combination of DVD-R and the DVD-Video format, a combination of DVD-RW and the DVD-Video format, a combination of DVD-RW and the DVD-VR format, and a combination of DVD+RW and the DVD+RW Video format.

Based on the result of determination by the second determining means, when the optical disc needs to be finalized, the display control means may control display of a button for instructing the recording apparatus to execute the finalization.

The finalization is one of session closing and border closing.

According to an embodiment of the present invention, a recording method is provided. This recording method includes the steps of acquiring (for example, in the step S12 shown in FIG. 3), from an optical disc, optical-disc-state information including at least information of the type of the optical disc, information of a recording format, and information indicating whether or not the optical disc is finalized, firstly determining (for example, in the step S14 shown in FIG. 3), based on the information of the type of the optical disc and the information of the recording format in the optical-disc-state information acquired in the acquiring step, whether or not the type of the optical disc and the recording format correspond to one of predetermined combinations, secondly determining (for example, in the step S15 or S17 shown in FIG. 3), based on the result of determination in the firstly determining step and the optical-disc-state information acquired in the acquiring step, whether or not the optical disc needs to be finalized, and controlling (for example, in the step S16, S18, or S19 shown in FIG. 3) display of a message representing the need of the finalization when it is determined that the optical disc needs to be finalized.

According to an embodiment of the present invention, a program is provided. This program executes the steps of acquiring (for example, in the step S12 shown in FIG. 3), from an optical disc, optical-disc-state information including at least information of the type of the optical disc, information of a recording format, and information indicating whether or not the optical disc is finalized, firstly determining (for example, in the step S14 shown in FIG. 3), based on the information of the type of the optical disc and the information of the recording format in the optical-disc-state information acquired in the acquiring step, whether or not the type of the optical disc and the recording format correspond to one of predetermined combinations, secondly determining (for example, in the step S15 or S17 shown in FIG. 3), based on the result of determination in the firstly determining step and the optical-disc-state information acquired in the acquiring step, whether or not the optical disc needs to be finalized, and controlling (for example, in the step S16, S18, or S19 shown in FIG. 3) display of a message representing the need of the finalization when it is determined that the optical disc needs to be finalized.

Figure 11:
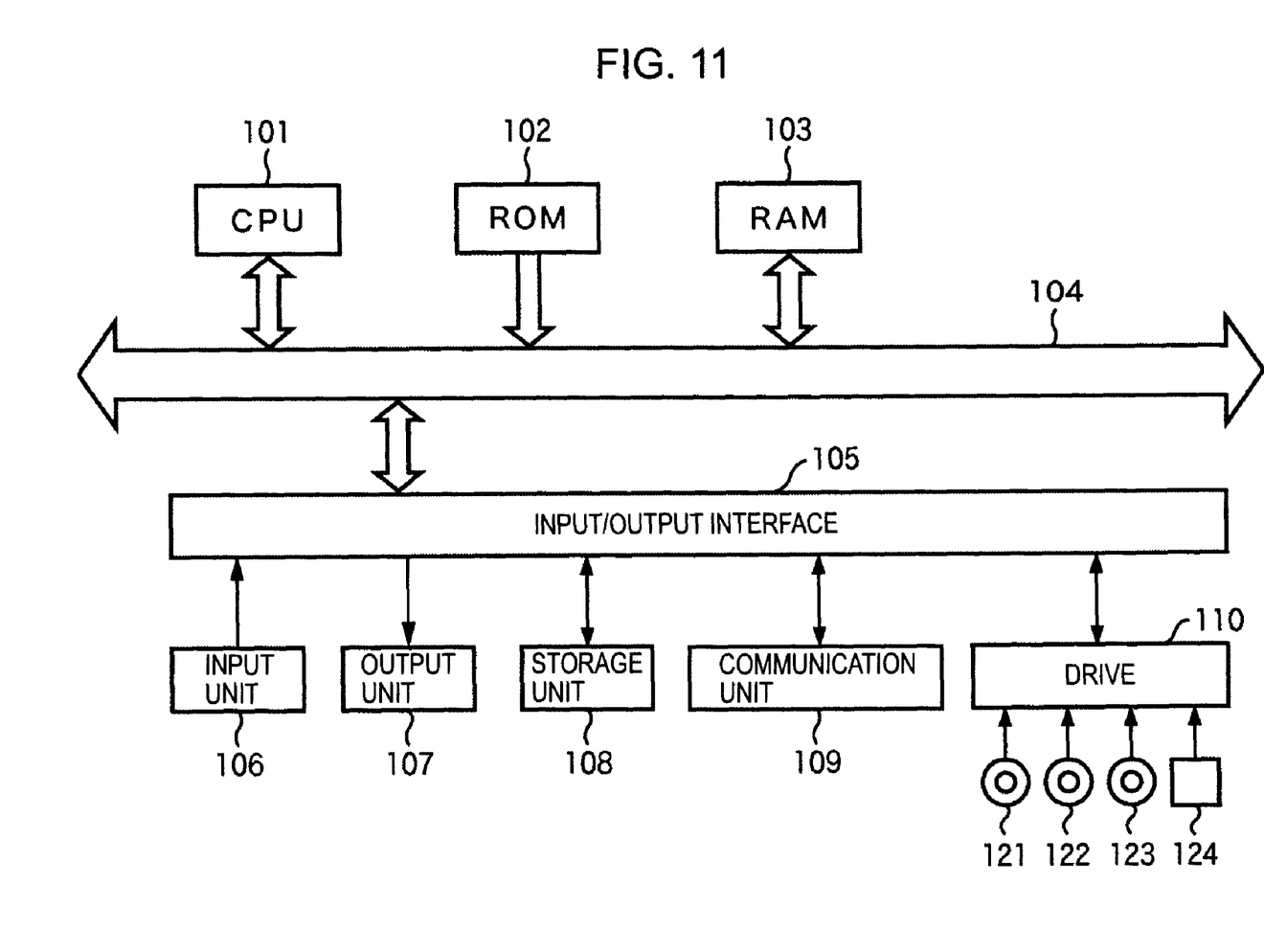
FIG. 11 is a block diagram showing the configuration of a digital camcorder.

This program may be stored in a storage medium (e.g., the magnetic disk shown in FIG. 11).

An embodiment of the present invention is described below with reference to the accompanying drawings.

Figure 1:
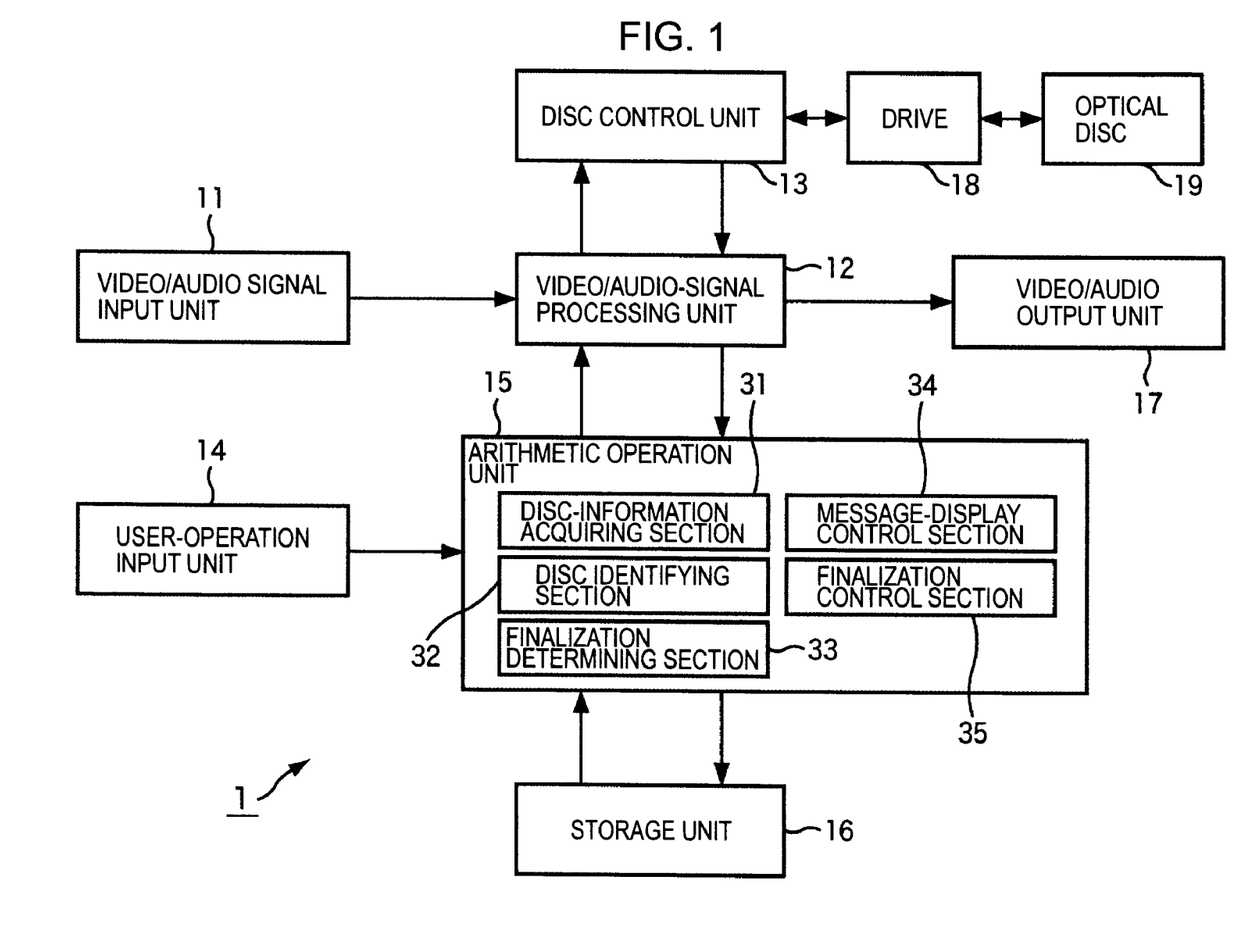
FIG. 1 is a block diagram showing the configuration of a digital camcorder according to an embodiment of the present invention.

FIG. 1 is a block diagram showing the configuration of a digital camcorder 1 according to an embodiment of the present invention.

The digital camcorder 1 is an example of a recording apparatus that records data on an optical disc.

A audio/video signal input unit 11 includes, for example, an optical system such as lenses, an imaging device such as a charge-coupled device (CCD), a signal input terminal to which an external signal is input, and a video signal circuit for processing a video signal.

The audio/video signal input unit 11 converts a captured image or an image input from the signal input terminal into image data, and supplies the image data to an audio/video-signal processing unit 12.

The audio/video signal input unit 11 also includes, for example, an audio signal input terminal to which an audio signal is input from the exterior such as a built-in microphone or an external microphone, and an audio signal processing circuit for processing an audio signal.

The audio/video signal input unit 11 converts sound collected by the built-in microphone or sound input from the audio signal input terminal into audio data, and supplies the audio data to the audio/video-signal processing unit 12.

The audio/video-signal processing unit 12 includes, for example, a video-signal encoding circuit or decoding circuit, and a circuit that combines information, such as OSD (On Screen Display), with the video signal.

In a data recording mode, the audio/video-signal processing unit 12 compresses and converts the image data supplied from the audio/video signal input unit 11. The audio/video-signal processing unit 12 adds, to the image data, display information supplied from an arithmetic operation unit 15 (described later), and supplies the information-added image data, as information to be recorded on the optical disc, to the disc control unit 13.

In a data playback mode, the audio/video-signal processing unit 12 decompresses image data supplied from a disc control unit 13. The audio/video-signal processing unit 12 adds, to the decompressed image data, OSD information, etc., supplied from the arithmetic operation unit 15, if necessary, and supplies an audio/video output unit 17 with the image data to which the OSD information is added.

In addition, the audio/video-signal processing unit 12 includes, for example, an audio-signal encoding circuit or decoding circuit.

In the data recording mode, the audio/video-signal processing unit 12 compresses and converts the audio data supplied from the audio/video signal input unit 11. The audio/video-signal processing unit 12 supplies the converted audio data, as information to be recorded on the optical disc, to the disc control unit 13.

In the data playback mode, the audio/video-signal processing unit 12 decompresses audio data supplied from the disc control unit 13. The audio/video-signal processing unit 12 supplies the decompressed audio data to the audio/video output unit 17.

In the data recording mode, the disc control unit 13 controls a drive 18 to record, on an optical disc 19 loaded in the drive 18, the information (to be recorded on the optical disc 19) which is supplied from the audio/video-signal processing unit 12. In addition, in the data playback mode, the disc control unit 13 controls the drive 18 to supply the audio/video-signal processing unit 12 with image data or audio data read from the optical disc 19.

By controlling the drive 18 to perform an operation such as driving the optical disc 19, the disc control unit 13 acquires optical disc information such as information of an optical disc type, information on a recording format, or optical-disc-state information. In response to a request of the arithmetic operation unit 15 for acquiring optical disc information, the disc control unit 13 supplies, as optical disc information, information of the optical disc type, information of the recording format, or the optical-disc-state information to the arithmetic operation unit 15.

Under the control of the arithmetic operation unit 15, the disc control unit 13 controls the drive 18 to execute finalization, such as session closing, on the optical disc 19.

A user-operation input unit 14 is formed as an interface for a user to operate the digital camcorder 1, and includes, for example, a recording button and a disc unloading button, or a touch-sensitive panel on a liquid crystal display (LCD). The user-operation input unit 14 supplies the arithmetic operation unit 15 with control signals corresponding to a camera-function change, a recording start, a recording end, unloading of the optical disc 19, and the execution of finalization, which are based on user's operations.

In the following description, among the control signals corresponding to the user's operations, a control signal that requests unloading of the optical disc 19, for example, in a case in which a button for unloading the optical disc 19 is pressed, is referred to as an optical disc unloading request.

The arithmetic operation unit 15 includes, for example, a central processing unit (CPU), a read-only memory (ROM), and a random access memory (RAM), and executes various types of processing in accordance with programs stored in the ROM. In the RAM, which is built into the arithmetic operation unit 15, programs to be executed by the CPU and data are stored, if necessary.

In response to the optical disc unloading request supplied from the user-operation input unit 14, based on the optical disc information supplied from the disc control unit 13, the arithmetic operation unit 15 determines whether the optical disc 19 needs finalization. The arithmetic operation unit 15 controls display of a message corresponding to the result of determination.

The arithmetic operation unit 15 includes a disc-information acquiring section 31, a disc identifying section 32, a finalization determining section 33, a message-display control section 34, and a finalization control section 35.

In response to the optical disc unloading request supplied from the user-operation input unit 14, the disc-information acquiring section 31 acquires information of the optical disc 19 from the disc control unit 13.

Specifically, in response to the optical disc unloading request supplied from the user-operation input unit 14, the disc-information acquiring section 31 acquires, from the disc control unit 13, as the information of the optical disc 19, information of the optical disc type, information of the recording format, and the optical-disc-state information. The disc-information acquiring section 31 supplies the disc identifying section 32 with the information of the optical disc type and recording format in the optical disc information acquired from the disc control unit 13, and supplies the finalization determining section 33 with the optical-disc-state information in the optical disc information acquired from the disc control unit 13.

Here, the optical disc type means a standard with which the optical disc 19 conforms. For example, when the optical disc 19 is, for example, a DVD, the standard is DVD-ROM (Digital Versatile Disc Read Only Memory), DVD-RAM (Digital Versatile Disc Random Access Memory), DVD-R (DVD Specifications for Recordable Disc), DVD-RW (DVD Specifications for Re-recordable Disc), DVD+R (DVD Specifications for +Recordable Disc), or DVD+RW (DVD Specifications for +ReWritable Disc).

In addition, when the optical disc 19 is a DVD, the recording format represents (information representing) a recording format such as DVD-Video (video mode), DVD-VR (DVD-Video Recording) (VR mode), or DVD+RW Video (+VR mode).

Furthermore, the optical-disc-state information is, for example, information related to an optical disc state such as optical-disc lead-out information (information that is recorded on an optical disc in finalization mode).

Based on the information of the optical disc type in the optical disc information supplied from the disc-information acquiring section 31, the disc identifying section 32 determines whether the type of the optical disc 19 is one of predetermined types of optical discs.

Specifically, based on the information of the optical disc type in the optical disc information supplied from the disc-information acquiring section 31, the disc identifying section 32 determines whether the type of the optical disc 19 is one of DVD-R, DVD-RW, and DVD+RW discs.

In addition, based on the information of the optical disc type and recording format in the optical disc information supplied from the disc-information acquiring section 31, the disc identifying section 32 determines whether the type and recording format of the optical disc 19 is one of predetermined combinations.

Specifically, based on the information of the optical disc type and recording format in the optical disc information supplied from the disc-information acquiring section 31, the disc identifying section 32 determines whether the optical disc 19 is one of a DVD-R or DVD-RW disc having a recording in DVD-Video format (video mode), a DVD-RW disc having a recording in DVD-VR format (VR mode), and a DVD+RW disc having a recording in DVD+RW Video format.

Based on the optical-disc-state information supplied from the disc-information acquiring section 31, a finalization determining section 33 determines whether the optical disc 19 is in already finalized state. For example, based on lead-out information as the optical-disc-state information supplied from the disc-information acquiring section 31, the finalization determining section 33 determines whether the optical disc 19 is in already finalized state.

By acquiring a message stored in the storage unit 16 and supplying the message to the audio/video-signal processing unit 12, the message-display control section 34 controls the audio/video output unit 17 to display the message.

For example, by acquiring the message "FOR PLAYBACK WITH PLAYER, FINALIZATION IS NEEDED. FINALIZATION CAN BE EXECUTED FROM THE MENU." and supplying the acquired message to the audio/video-signal processing unit 12, the message-display control section 34 controls the audio/video output unit 17 to display the message "FOR PLAYBACK WITH PLAYER, FINALIZATION IS NEEDED. FINALIZATION CAN BE EXECUTED FROM THE MENU.".

The finalization control section 35 controls the disc control unit 13 to execute finalization on the optical disc 19 loaded into the drive 18.

The storage unit 16 includes a nonvolatile memory such as an electronically erasable and programmable read only memory (EEPROM) or a flash memory, and stores display information which is superimposed on the image data by the audio/video-signal processing unit 12.

The storage unit 16 stores, for example, display information for using the audio/video output unit 17 to indicate, in OSD form, that finalization, such as session closing, is needed.

More specifically, the storage unit 16 stores, for example, the sentences "FOR PLAYBACK WITH PLAYER, FINALIZATION IS NEEDED. FINALIZATION CAN BE EXECUTED FROM THE MENU." as a message for urging finalization, the sentence "FOR CREATING DVD MENU, FINALIZATION IS NEEDED. FINALIZATION CAN BE EXECUTED FROM THE MENU." as a message for urging finalization in a DVD menu creating mode, the sentences "WHEN DISC CANNOT BE PLAYED BACK BY PLAYER, FINALIZE DISC. FINALIZATION CAN BE EXECUTED FROM THE MENU." as a message for recommending finalization, etc.

The audio/video output unit 17 includes, for example, an LCD panel, a speaker, and an external output terminal, and outputs the image data and audio data supplied from the audio/video-signal processing unit 12 to the components.

When the optical disc 19 is loaded, the drive 18 drives the optical disc 19, and acquires a program and data recorded on the optical disc 19. The drive 18 supplies the acquired program and data to the disc control unit 13.

The optical disc 19 is a recording medium, such as a CD, a DVD, or a blue-ray disc, on which data is read and recorded by using a laser beam. Regarding the optical disc 19, there are various standards corresponding to types of recording media. For example, for DVDs, as described above, there are standards such as DVD-ROM, DVD-RAM, DVD-R, DVD-RW, DVD+R, and DVD+RW.

Next, patterns that need finalization depending on combinations of types of optical discs, which are each loaded as the optical disc 19 in the drive 18, and recording formats (video recording systems) are described below with reference to FIG. 2.

In the patterns (shown in FIG. 2) that need finalization by using combinations of types of optical discs and recording formats, the first row indicates items of the "types of optical discs", and the second and subsequent rows indicate data items by recording format. In addition, the first column indicates items of "types of recording formats", the second column indicates types of optical discs belonging to "DVD-R", the third column indicates types of optical discs belonging to "DVD-RW", and the fourth column indicates types of optical discs belonging to "DVD+RW". In other words, the example shown in FIG. 2 indicates whether finalization on an optical disc is needed depending on a combination of the type of the optical disc and a recording format.

Figure 2:
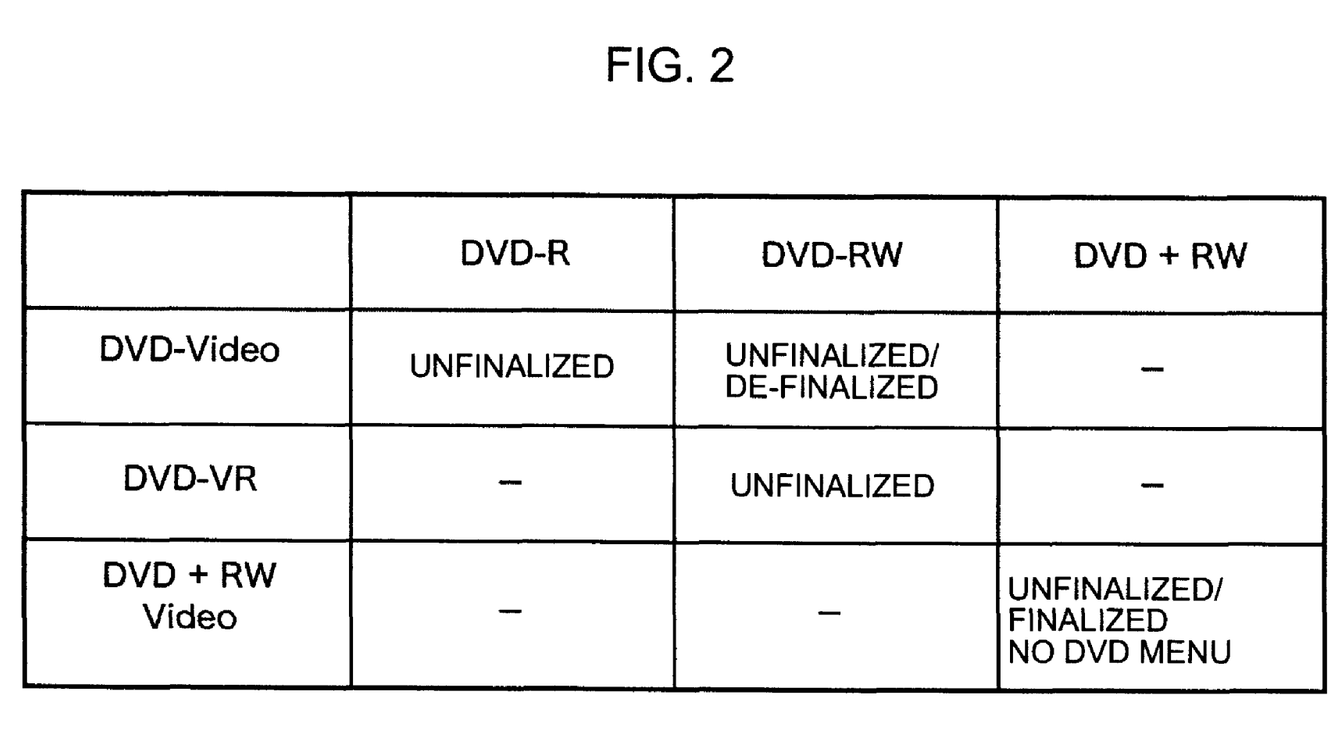
FIG. 2 is a table showing patterns that need finalization depending on combinations of types and recording formats (video recording systems) of optical discs.

The representation "UNFINALIZED" in the second row from the top and the second column from the left in FIG. 2 indicates that data is recorded in the "DVD-Video" recording format and that, when the disc is unfinalized, finalization is needed (possible).

The representation "UNFINALIZED/DE-FINALIZED" in the second row from the top and the third column from the left in FIG. 2 indicates that data is recorded in the "DVD-Video" recording format, and that, when the disc is "unfinalized" or "de-finalized" (i.e., in a de-finalized state), finalization is needed (possible).

The representation "–" in the second row from the top and the fourth column from the left in FIG. 2 indicates that no combination of "DVD+RW" and "DVD-Video" exists since data is not recorded on a DVD+RW disc in the "DVD-Video" recording format. In other words, the representation "–" represents no need of finalization. In the subsequent rows, the representations "–" represent no need of finalization.

Next, the representation "–" in the third row from the top and the second column from the left in FIG. 2 indicates that no combination of "DVD-R" and "DVD-VR" exists since data is not recorded on a DVD-R disc in the "DVD-VR" recording format.

In addition, the representation "UNFINALIZED" in the third row from the top and the third column from the left in FIG. 2 indicates that data is recorded on a DVD-RW disc in the "DVD-VR" recording format, and that, when the disc is "unfinalized", finalization is needed (possible).

Figure 4:
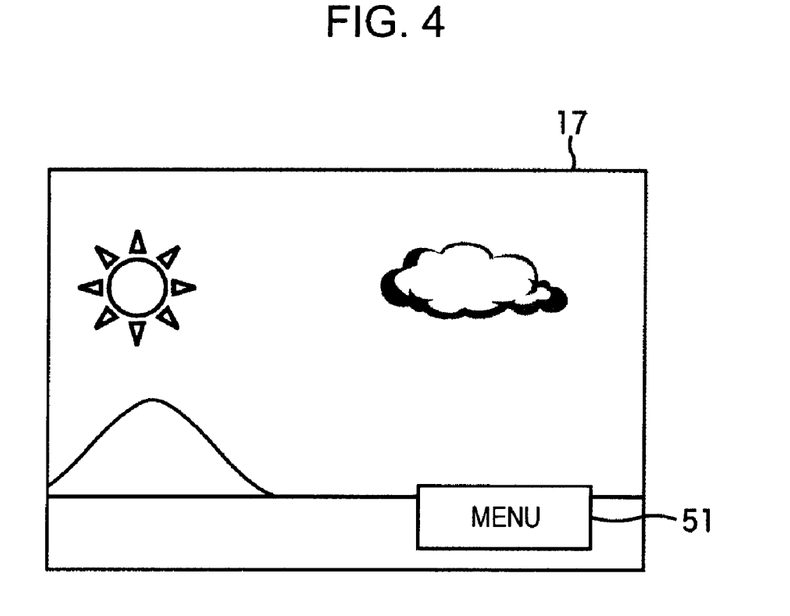
FIG. 4 is an illustration of an example of a screen, from an audio/video output unit of a digital camcorder, displaying a menu button, etc.

The representation "–" in the third row from the top and the fourth column from the left in FIG. 4 indicates that no combination of "DVD-RW" and "DVD-VR" exists since data is not recorded on a DVD+RW disc in the "DVD-VR" recording format (since the DVD-VR recording format is used for DVD-RW).

Next, the representation "–" in the fourth row from the top and the second column from the left in FIG. 2 indicates that no combination of "DVD-R" and "DVD+RW Video" exists since data is not recorded on a DVD+RW disc in the "DVD+RW" recording format (since the "DVD-RW Video" recording format is used for DVD+RW).

The representation "–" in the fourth row from the top and the third column from the left in FIG. 2 indicates that no combination of "DVD-RW" and "DVD+RW Video" exists since data is not recorded on a DVD-RW disc in the "DVD+RW Video" recording format (since the "DVD+RW Video" recording format is used for DVD+RW).

The representation "UNFINALIZED/FINALIZED (causing) NO DVD MENU" in the fourth row from the top and the fourth column from the left in FIG. 2 indicates that, when an "unfinalized" or "finalized" state causes no DVD menu (there is no DVD menu since the disc is in finalized state), finalization is needed (possible). In other words, when there is no DVD menu since the disc is in already finalized state, the already finalized optical disc has high compatibility, for a user who wishes to create a DVD menu. Thus, a message for urging finalization is displayed for the purpose of informing the user of a method for creating the DVD menu.

In other words, as the patterns that need (enable) finalization depending on combinations of types of optical discs and recording formats, there are four patterns, that is, DVD-R and DVD-RW discs having recordings in video mode, a DVD-RW disc having a recording in VR mode, and a DVD-RW disc having a recording in +VR mode.

Here, the types of optical discs and recording formats are more specifically described below.

At first, in the patterns (shown in FIG. 2) that need finalization depending on combinations of types of optical discs and recording formats, the optical disc types described in the first row are more specifically described.

The DVD-R standard is of a write-once type in which data can be written only once. The DVD-R standard has a feature in having compatibility with other DVD standards such as the DVD-ROM and DVD-RAM standards. The DVD-R standard complies with a DVD-Video recording format.

In addition, the DVD-RW standard is of a rewritable type. There is also the DVD-RAM standard of a similar rewritable type. The DVD-RAM standard is for data recording, and the DVD-RW has a feature in focusing on a video-recording use. The DVD-RW standard complies with two recording formats DVD-Video and DVD-VR.

Furthermore, the DVD-RW standard is of a rewritable type. Compared with the DVD-RW, the DVD-RW standard has higher compatibility in specifications, and has a feature in that recorded data can be read by many types of DVD-ROM drives. The DVD+RW complies with the DVD+RW Video recording format.

By storing, in the storage unit 16, in table form, the patterns (shown in FIG. 2) that need finalization depending on combinations of types of optical discs and recording formats (video recording systems), based on the table stored in the storage unit 16, the disc identifying section 32 may identify the above four patterns (patterns that need (enable) finalization depending on combinations of types of optical discs and recording formats).

Next, in the patterns (shown in FIG. 2) that need finalization depending on combinations of types of optical discs and recording formats, the recording format (video recording system) described in the first column is more specifically described.

The DVD-Video recording format (hereinafter referred to as the "video model") represents technical specifications for recording video on DVD media which are formulated in the DVD forum, and a video DVD created in accordance with the technical specifications. In this recording format, the MPEG-2 standard is employed for image compression. The video mode is used as a recording format for DVD-R and DVD-RW discs.

The DVD-VR recording format is one of recording formats for recording video on DVD media, and has a feature in being adapted for real-time video recording or editing which is later performed. The DVD-VR recording format has no compatibility with the DVD-Video recording format. The VR mode is used as a recording format for DVD-RW and DVD-RAM discs.

The DVD+RW Video recording format (hereinafter referred to as the "+VR mode") has a use for recording video on a DVD+RW disc. The DVD+RW Video recording format has a feature in realizing recording, writing once, or rewriting, in real time, while ensuring compatibility in existing DVD players and drives for personal computers. The +VR mode is used as a recording format for DVD+RW discs.

In the examples shown in FIG. 2, the patterns that need (enable) finalization depending on combinations of types of optical discs and recording formats (recording systems) have been described. An example of processing that notifies the user of a method for executing finalization when the finalization is needed (possible) is described below with reference to FIGS. 3 to 10.

At first, a process for displaying a finalization message is described below with reference to the flowchart shown in FIG. 3. Specifically, the flowchart in FIG. 3 indicates, as an example of processing that notifies the user of a method for executing finalization in the digital camcorder 1 according to the embodiment of the present invention, a process for displaying a finalization message on the audio/video output unit 17 of the digital camcorder 1.

In step S11, when an optical disc unloading button (not shown) provided on the digital camcorder 1 is pressed by the user, the user-operation input unit 14 supplies the disc-information acquiring section 31 with an optical disc unloading request which is a signal that requests unloading of the optical disc 19.

FIG. 4 shows an example of a screen on the audio/video output unit 17 of the digital camcorder 1 which displays a menu button 51, etc.

As shown in FIG. 4, the audio/video output unit 17 of the digital camcorder 1 displays an image (hereinafter referred to as a "landscape image") containing the sun, a cloud, and a mountain, and also displays the menu button 51 in a form superimposed on the landscape image.

Referring back to FIG. 3, for example, in step S11, when the optical disc unloading button is pressed by the user while the landscape image is displayed by the audio/video output unit 17 of the digital camcorder 1, the user-operation input unit 14 supplies the optical disc unloading request to the arithmetic operation unit 15.

In step S12, in response to the optical disc unloading request supplied from the user-operation input unit 14, the disc-information acquiring section 31 acquires, as the optical disc information from the disc control unit 13, information of the type of the optical disc 19, information of the recording format, and the optical-disc-state information. The disc-information acquiring section 31 supplies the disc identifying section 32 with the information of the optical disc type and recording format in the optical disc information acquired from the disc control unit 13. The disc-information acquiring section 31 also supplies the finalization determining section 33 with the optical-disc-state information in the optical disc information acquired from the disc control unit 13.

In step S13, based on the optical disc type information supplied from the disc-information acquiring section 31, the disc identifying section 32 determines whether the type of the optical disc 19 loaded in the drive 18 is one of DVD-R, DVD-RW, and DVD+RW discs.

In other words, in step S13, based on the optical disc type information supplied from the disc-information acquiring section 31, the disc identifying section 32 determines whether the type of the optical disc 19 loaded in the drive 18 is one of predetermined types of optical discs.

If, in step S13, it is determined that the type of the optical disc 19 loaded in the drive 18 is not one of DVD-R, DVD-RW, and DVD+RW discs, the process proceeds to step S22 since it is not necessary to perform finalization. Under the control of the arithmetic operation unit 15, the disc control unit 13 executes optical-disc unloading for unloading the optical disc 19 loaded in the drive 18, and the process ends.

Alternatively, if, in step S13, it is determined that the type of the optical disc 19 is one of DVD-R, DVD-RW, and DVD+RW discs, the process proceeds to step S14. In step S14, based on the information of the optical disc type and recording format supplied from the disc-information acquiring section 31, the disc identifying section 32 determines whether the optical disc 19 loaded in the drive 18 is one of DVD-R and DVD-RW discs having recordings in the video mode, and a DVD-RW disc having a recording in the VR mode.

In other words, in step S14, based on the information of the optical disc type and recording format supplied from the disc identifying section 32, the disc identifying section 32 determines whether the optical disc 19 loaded in the drive 18 has one of predetermined combinations (e.g., the above-described patterns (in FIG. 2) that need (enable) finalization depending on combinations of types of optical discs and recording formats).

As described above, the patterns that need (enable) finalization depending on combinations of types of optical discs and recording formats are, for example, four patterns, that is, DVD-R and DVD-RW discs having recordings in the video mode, a DVD-RW disc having a recording in the VR mode, and a DVD+RW disc having a recording in the +VR mode. When the optical disc 19 corresponds to the pattern of the DVD+RW disc having a recording in the +VR mode among the four patterns, a message to be displayed differs from messages for the other patterns. Accordingly, in step S14, the pattern of the DVD+RW disc having a recording in the +VR mode is distinguished from the other three patterns.

If, in step S14, it is determined that the optical disc 19 loaded in the drive 18 is one of the DVD-R and DVD-RW discs having recordings in the video mode, and the DVD-RW having a recording in the VR mode, the process proceeds to step S15. In step S15, based on the optical-disc-state information supplied from the disc-information acquiring section 31, the finalization determining section 33 determines whether the optical disc 19 loaded in the drive 18 is in the already finalized state.

For example, in step S15, based on optical-disc lead-out information included in the optical disc state information supplied from the disc-information acquiring section 31, the finalization determining section 33 determines whether the optical disc 19 loaded in the drive 18 is in the already finalized state.

If, in step S15, it is determined that the optical disc 19 loaded in the drive 18 is in the already finalized state, the process proceeds to step S16. In step S16, the message-display control section 34 acquires a finalization urging message stored in the storage unit 16, and supplies the message to the audio/video-signal processing unit 12. By supplying the audio/video output unit 17 with the finalization urging message supplied from the message-display control section 34, the audio/video-signal processing unit 12 uses the audio/video output unit 17 to display the supplied message.

For example, in step S16, the message-display control section 34 acquires, as the finalization urging message, the message "FOR PLAYBACK WITH PLAYER, FINALIZATION IS NEEDED. FINALIZATION CAN BE EXECUTED FROM THE MENU.", and supplies the acquired message to the audio/video-signal processing unit 12. By supplying the audio/video output unit 17 with the message "FOR PLAYBACK WITH PLAYER, FINALIZATION IS NEEDED. FINALIZATION CAN BE EXECUTED FROM THE MENU." supplied from the message-display control section 34, the audio/video-signal processing unit 12 uses the audio/video output unit 17 to display the supplied message.

Figure 5:
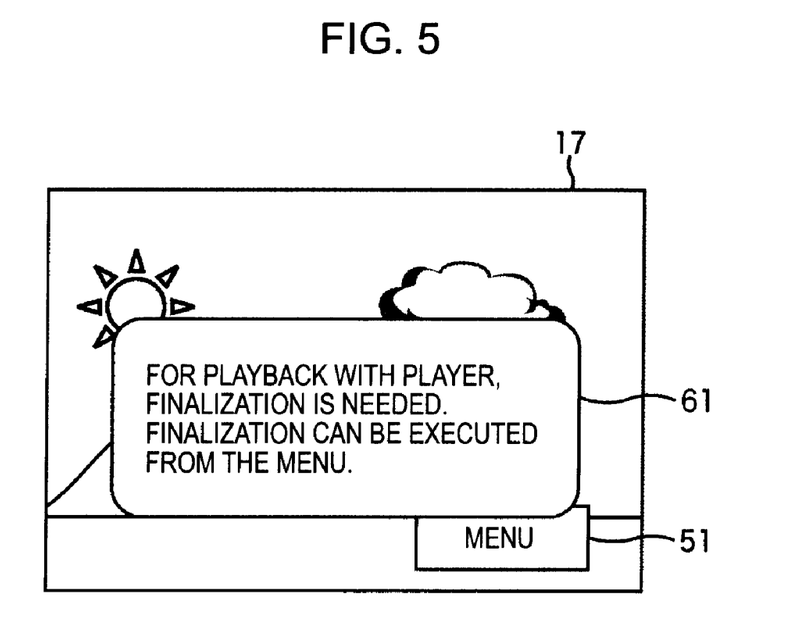
FIG. 5 is an illustration of an example of a screen, on the audio/video output unit of the digital camcorder, displaying a finalization message, etc.

FIG. 5 shows an example of a screen, on the audio/video output unit 17 of the digital camcorder 1, displaying a finalization message, etc.

In the example shown in FIG. 5, the audio/video output unit 17 of the digital camcorder 1 displays, for example, as a message 61 superimposed on a landscape image, the message "FOR PLAYBACK WITH PLAYER, FINALIZATION IS NEEDED. FINALIZATION CAN BE EXECUTED FROM THE MENU.", and also displays a menu button 51.

Referring back to FIG. 3, alternatively, if, in step S15, it is determined that the optical disc 19 loaded in the drive 18 is in the already finalized state, the process proceeds to step S22 since it is not necessary to perform finalization. In step S22, under the control of the arithmetic operation unit 15, the disc control unit 13 executes optical disc unloading for unloading the optical disc 19 loaded in the drive 18, and the process ends.

If, in step S14, it is determined that the optical disc 19 is not one of the DVD-R and DVD-RW discs having recordings in the video mode, and the DVD-RW disc having a recording in the VR mode, that is, if it is determined that the optical disc 19 corresponds to the DVD+RW disc having a recording in the +VR mode, the process proceeds to step S17. In step S17, the finalization determining section 33 determines whether the optical disc 19 loaded in the drive 18 has been finalized.

For example, in step S14, based on optical-disc lead-out information included in the optical-disc-state information supplied from the disc-information acquiring section 31, the finalization determining section 33 determines whether the optical disc 19 loaded in the drive 18 has been finalized.

If, in step S17, it is determined that the optical disc 19 loaded in the drive 18 has been finalized, the process proceeds to step S18. In step S18, the message-display control section 34 acquires a finalization urging message at a DVD-menu creating time which is stored in the storage unit 16, and supplies the acquired finalization urging message to the audio/video-signal processing unit 12. By supplying the audio/video output unit 17 with the finalization urging message at the DVD-menu creating time supplied from the message-display control section 34, the audio/video-signal processing unit 12 uses the audio/video output unit 17 to display the finalization urging message at the DVD-menu creating time.

For example, in step S18, the message-display control section 34 acquires the message "FOR CREATING DVD MENU, FINALIZATION IS NEEDED. FINALIZATION CAN BE EXECUTED FROM THE MENU." stored as the finalization urging message (at the DVD-menu creating time) stored in the storage unit 16, and supplies the acquired message to the audio/video-signal processing unit 12. By supplying the audio/video output unit 17 with the message "FOR CREATING DVD MENU, FINALIZATION IS NEEDED. FINALIZATION CAN BE EXECUTED FROM THE MENU." supplied from the message-display control section 34, the audio/video-signal processing unit 12 uses the audio/video output unit 17 to display the supplied message.

Figure 6:
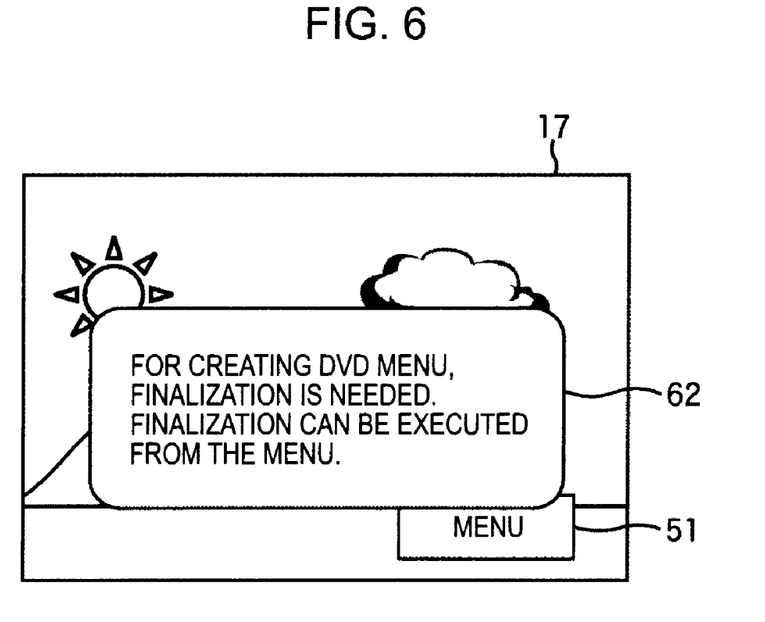
FIG. 6 is an illustration of an example of a screen, on the audio/video output unit of the digital camcorder, displaying a finalization message, etc.

FIG. 6 shows an example of a screen, on the audio/video output unit 17 of the digital camcorder 1, displaying a finalization message, etc.

In the example shown in FIG. 6, the audio/video output unit 17 of the digital camcorder 1 displays, as a message 62 superimposed on a landscape image, for example, the message "FOR CREATING DVD MENU, FINALIZATION IS NEEDED. FINALIZATION CAN BE EXECUTED FROM THE MENU.", and also displays the menu button 51.

Referring back to FIG. 3, alternatively, if, in step S17, it is determined that the optical disc 19 loaded in the drive 18 has not been finalized, the process proceeds to step S19. In step S19, the message-display control section 34 acquires a finalization recommending message stored in the storage unit 16, and supplies the acquired message to the audio/video-signal processing unit 12. By supplying the audio/video output unit 17 with the finalization recommending message supplied from the message-display control section 34, the audio/video-signal processing unit 12 uses the audio/video output unit 17 to display the finalization recommending message.

For example, in step S19, the message-display control section 34 acquires the message "WHEN DISC CANNOT BE PLAYED BACK BY PLAYER, FINALIZE DISC. FINALIZATION CAN BE EXECUTED FROM THE MENU." stored as a finalization recommending message in the storage unit 16, and supplies the acquired message to the audio/video-signal processing unit 12. By supplying the audio/video output unit 17 with the message "WHEN DISC CANNOT BE PLAYED BACK BY PLAYER, FINALIZE DISC. FINALIZATION CAN BE EXECUTED FROM THE MENU." supplied from the message-display control section 34, the audio/video-signal processing unit 12 uses the audio/video output unit 17 to display the supplied message.

Figure 7:
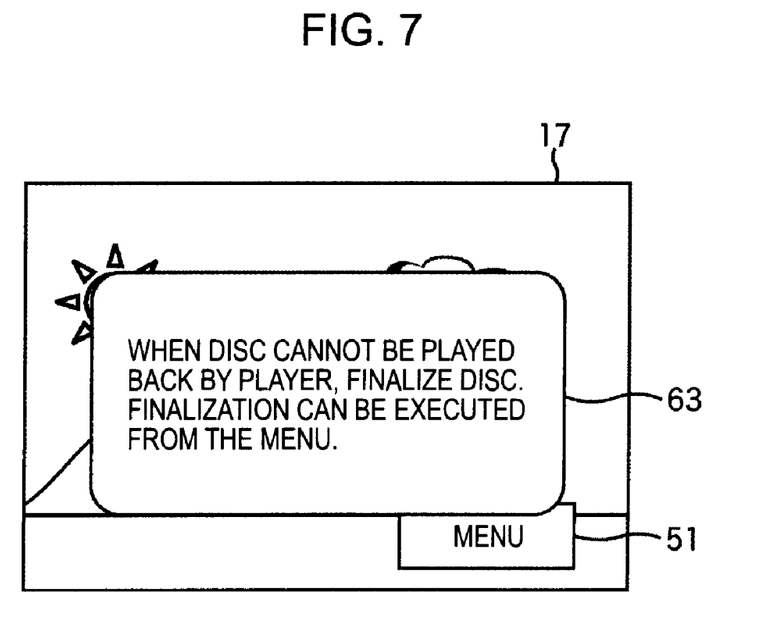
FIG. 7 is an illustration of an example of a screen, on the audio/video output unit of the digital camcorder, displaying a finalization message, etc.

FIG. 7 shows an example of a screen, on the audio/video output unit 17 of the digital camcorder 1, displaying a finalization message, etc.

In the example shown in FIG. 7, the audio/video output unit 17 of the digital camcorder 1 displays, for example, as a message 63 superimposed on a landscape image, the message "WHEN DISC CANNOT BE PLAYED BACK BY PLAYER, FINALIZE DISC. FINALIZATION CAN BE EXECUTED FROM THE MENU.", and also displays the menu button 51.

Referring back to FIG. 3, in step S20, the finalization determining section 33 determines whether finalization is to be executed by a user's operation.

Figure 8:
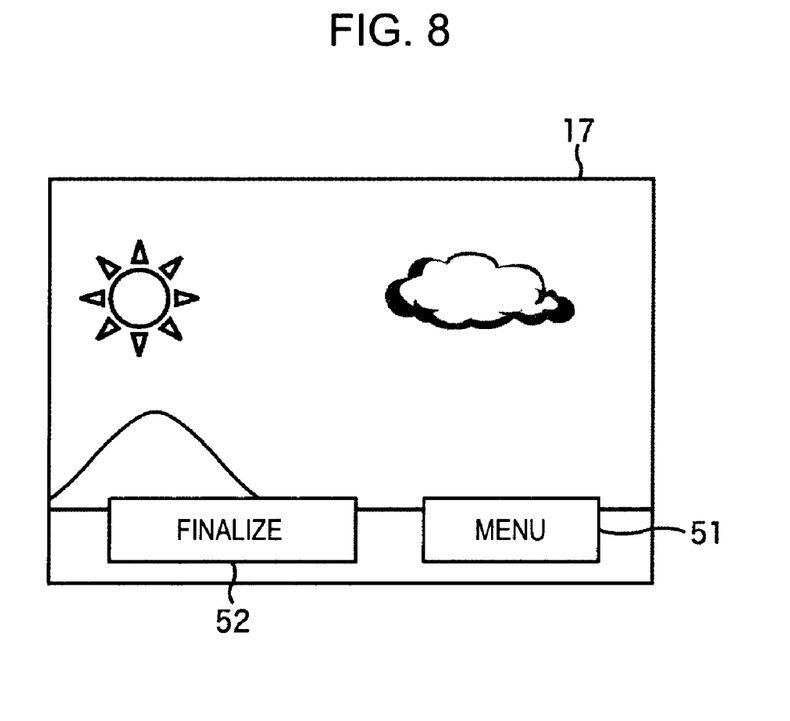
FIG. 8 is an illustration of an example of a screen, on the audio/video output unit of the digital camcorder, displaying a button for executing finalization, etc.

FIG. 8 shows an example of a screen, on the audio/video output unit 17 of the digital camcorder 1, displaying a button for executing finalization, etc.

In the example shown in FIG. 8, the audio/video output unit 17 of the digital camcorder 1 displays, for example, a finalization button 52 superimposed on a landscape image, and the menu button 51.

For example, in step S20, the finalization determining section 33 determines that, when the finalization button 52 is pressed by the user, the finalization is to be executed.

The screen, shown in FIG. 8, on the audio/video output unit 17 of the digital camcorder 1, displaying the finalization button 52, etc., is displayed when the user presses the menu button 51 in each of FIGS. 4 to 7, and FIGS. 9 and 10 (described later).

Referring back to FIG. 3, if, in step S20, it is determined that the finalization is to be executed, the process returns to step S21. In step S21, the finalization control section 35 controls the disc control unit 13 to execute the finalization on the optical disc 19 loaded in the drive 18.

Alternatively, if, in step S20, it is determined that the finalization is not to be executed, the process proceeds to step S22. In step S22, under the control of the arithmetic operation unit 15, the disc control unit 13 executes optical disc unloading for unloading the optical disc 19 loaded in the drive 18.

For example, in step S22, when the finalization button 52 superimposed on the landscape image in FIG. 8 is not pressed, the disc control unit 13 is controlled by the arithmetic operation unit 15 to execute optical disc unloading for unloading the optical disc 19 loaded in the drive 18.

Messages in a case that needs finalization are not limited to the above examples. For example, an execution time necessary to perform finalization when it is needed, etc., may be displayed.

Figure 9:
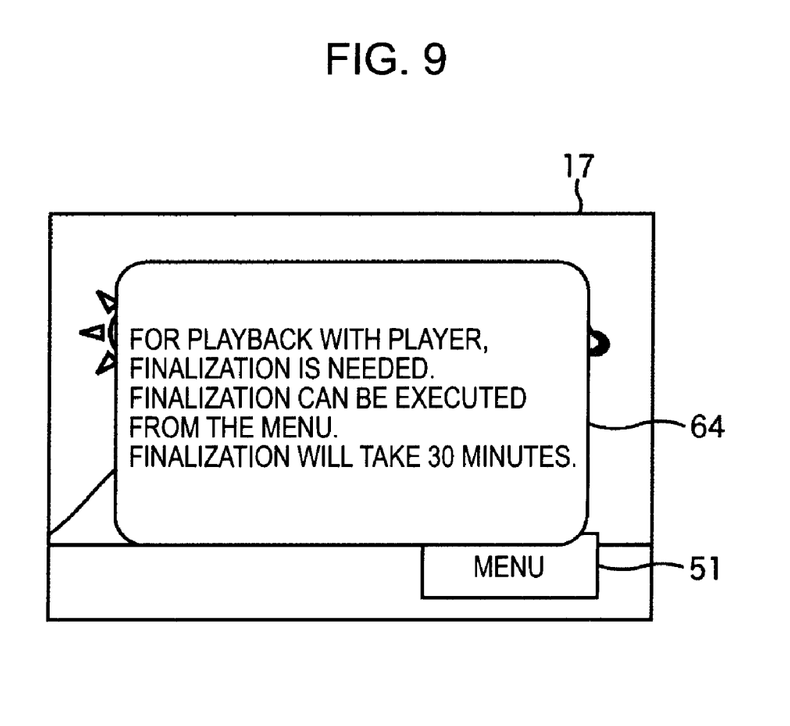
FIG. 9 is an illustration of an example of a screen, on the audio/video output unit of the digital camcorder, displaying a finalization message, etc.

FIG. 9 shows an example of a screen, on the audio/video output unit 17 of the digital camcorder 1, displaying a finalization message, etc.

In the example shown in FIG. 9, the audio/video output unit 17 of the digital camcorder 1 displays, for example, as a message 64 superimposed on a landscape image, the message "FOR PLAYBACK WITH PLAYER, FINALIZATION IS NEEDED. FINALIZATION CAN BE EXECUTED FROM THE MENU. FINALIZATION WILL TAKE 30 MINUTES.", and also displays the menu button 51.

As described above, by displaying beforehand a processing time for finalization, which takes a long time, the displayed time can be used as an indication of a termination time of the finalization, thus enabling the user to perform finalization without feeling stressed. In addition, when finalization is executed, a remaining time until the finalization ends is displayed, whereby the user can clearly know the ending time of the finalization.

Furthermore, also when it is not necessary to perform finalization, a message may be displayed.

Figure 10:
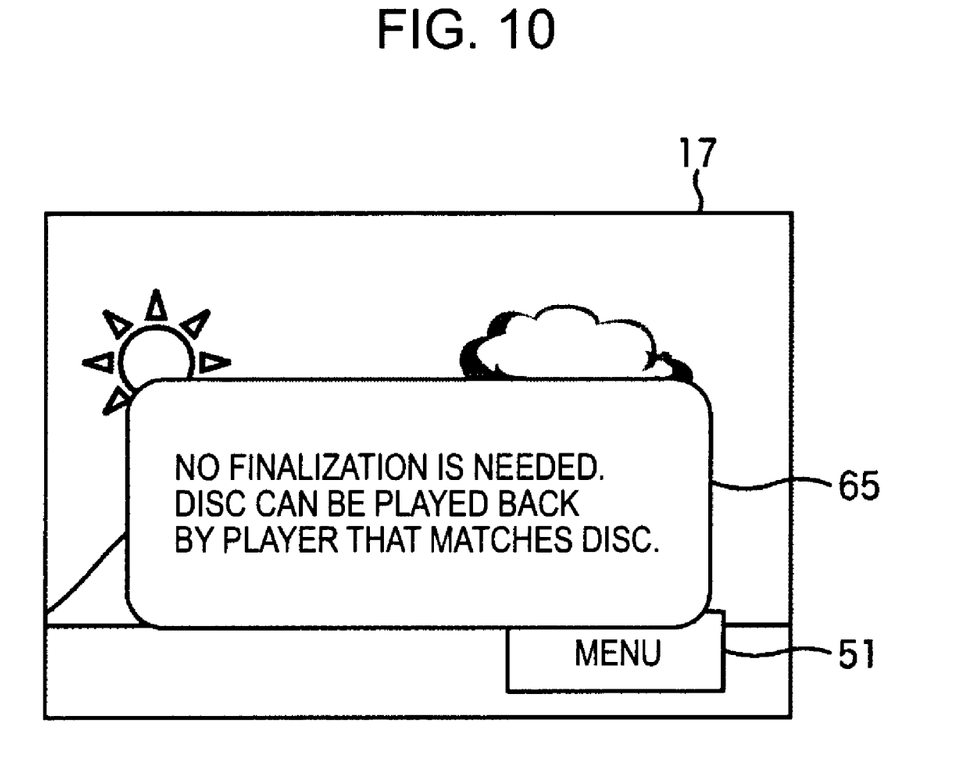
FIG. 10 is an illustration of an example of a screen, on the audio/video output unit of the digital camcorder, displaying a finalization message, etc.

FIG. 10 shows an example of a screen, on the audio/video output unit 17 of the digital camcorder 1, displaying a finalization message, etc.

In the example shown in FIG. 10, the audio/video output unit 17 of the digital camcorder 1 displays, for example, as a message 65 superimposed on a landscape image, the message "NO FINALIZATION IS NEEDED. DISC CAN BE PLAYED BACK BY PLAYER THAT MATCHES DISC.", and also displays the menu button 51.

Figure 3:
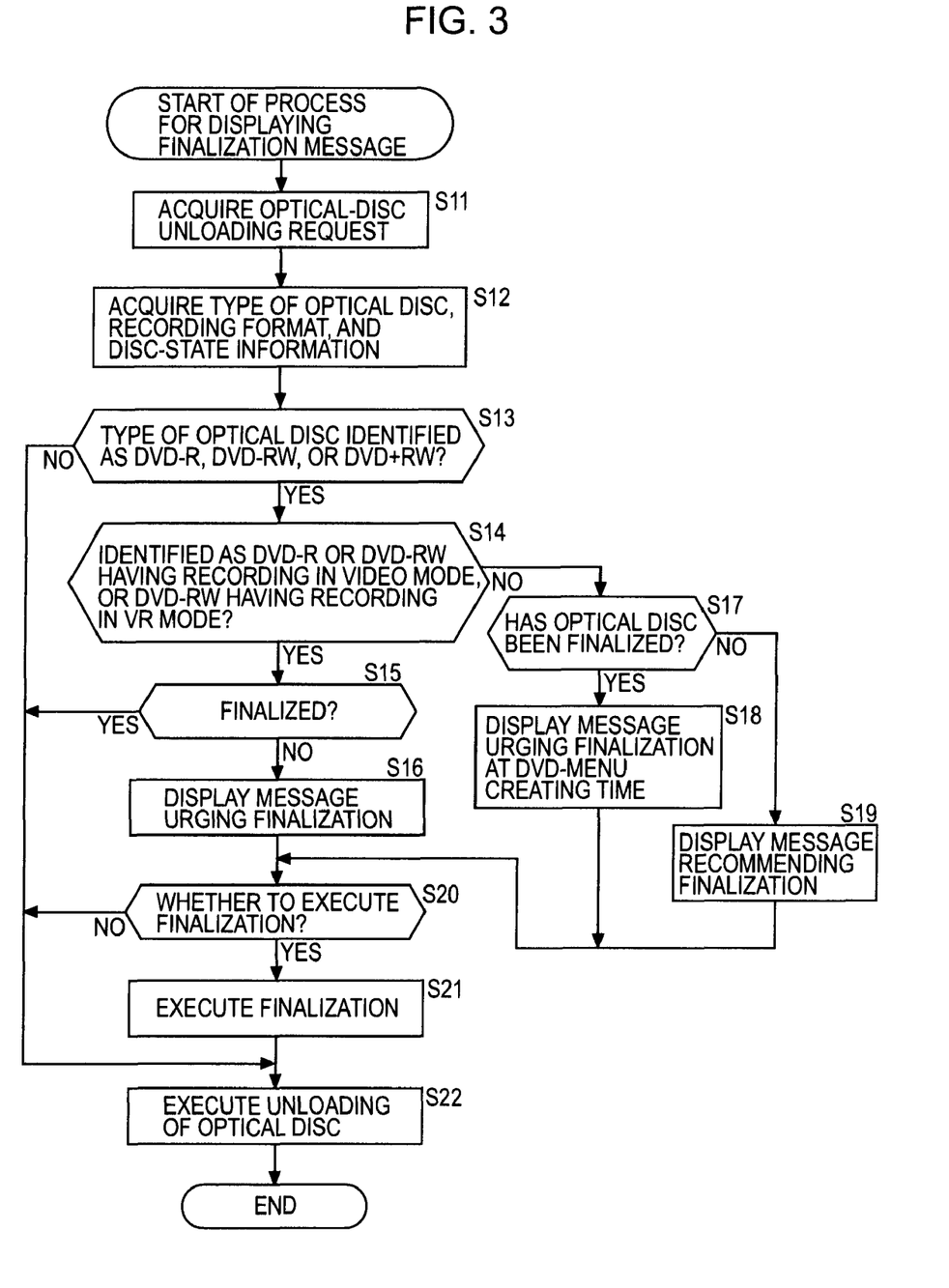
FIG. 3 is a flowchart illustrating a process for displaying messages concerning finalization.

Regarding the screen, on the audio/video output unit 17 of the digital camcorder 1, displaying the finalization message, etc., if, in step S15 in FIG. 3, it is determined that the optical disc 19 loaded in the drive 18 is in the finalized state, by using the audio/video output unit 17 to display the message 65 superimposed on the landscape image, the user can be notified that the finalization of the optical disc 19 loaded in the drive 18 has already finished.

As described above, by displaying a message also when the finalization is not necessary, the user can be notified that the finalization of the optical disc 19 loaded in the drive 18 has already finished. Thus, it is ensured that the user can play back the optical disc 19 by using a player or the like.

As described above, when finalization is necessary, messages corresponding to types of optical discs and recording formats can be displayed. Thus, by executing finalization of the optical disc 19 in response to a user's operation, when the optical disc 19 is played back by using another recording/playback apparatus, it is more ensured that the optical disc 19 can be played back.

The above consecutive processing may be executed by a personal computer.

FIG. 11 is a block diagram showing an example of the configuration of the digital camcorder 1 in a case in which the above consecutive processing is executed by a personal computer. A CPU 101 executes various types of processing in accordance with programs recorded in a ROM 102 or a recording unit 108. A RAM 103 stores programs to be executed by the CPU 101, data, etc., if necessary. The CPU 101, the ROM 102, and the RAM 103 are connected to one another by a bus 104.

The CPU 101 also connects to an input/output interface 105 through the bus 104. The input/output interface 105 connects to an input unit 106 including a keyboard, a mouse, and a microphone, and to an output unit 107 including a display and a speaker. The CPU 101 executes various types of processing in response to instructions input from the input unit 106. The CPU 101 outputs, to the output unit 107, an image, etc., obtained as the result of processing.

The recording unit 108 connected to the input/output interface 105 is formed by, for example, a hard disk, and, in the recording unit 108, the programs to be executed by the CPU 101 and various types of data are recorded. A communication unit 109 communicates with an external apparatus through the Internet, or another network. In this case, the communication unit 109 operates as an interface (with the exterior) that acquires an input image or outputs an output image.

In addition, a program may be acquired through the communication unit 109 and may be recorded in the recording unit 108.

When a magnetic disk 121, an optical disc 122, a magneto-optical disc 123, a semiconductor memory 124, or the like, is loaded, a drive 110 connected to the input/output interface 105 drives the loaded medium and acquires programs and data recorded in the medium. The acquired programs and data are transferred and recorded in the recording unit 108, if necessary.

A recording medium storing programs for the above consecutive processing is formed not only by package media, distributed for providing programs to the user separately for a computer, including the (program-recorded) magnetic disk 121 (including a flexible disc), optical disc 122 (including a CD-ROM and a DVD), magneto-optical disc 123 (including an MD (MiniDisc)), and semiconductor memory 124, but only by the ROM 102, which has programs recorded therein and which is provided to the user in a form built into the computer, and a hard disk included in the recording unit 108.

The programs for executing the above-described consecutive processing may be installed into a computer through a wired or wireless communication medium, such as a local area network, the Internet, or digital satellite broadcasting, by using an interface such as a router or a modem, if necessary.

In addition, in this specification, steps constituting a program stored in a recording medium definitely include steps that are performed in a time-series manner in given order, and also includes steps which are executed in parallel or separately even if the steps are not necessarily executed in a time-series manner.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus for recording data on an optical disc, comprising:
    acquiring means for acquiring information from the optical disc, the information including at least information of a type of the optical disc, information of a recording format of the optical disc, and information indicating whether or not the optical disc has already been finalized;
    determining means for determining whether or not the optical disc needs to be finalized, wherein the determination is based on matching (i) the type of the optical disc, (ii) the information of a recording format of the optical disc, and (iii) the information indicating whether or not the optical disc has already been finalized to one or more patterns; and
    display control means for controlling the display of a message based on the result of the determination by the determining means.

2. A recording apparatus according to claim 1, wherein, when the determining means determines that the optical disc needs to be finalized, the display control means controls the display of a message representing the need for the finalization.

3. A recording apparatus according to claim 1, wherein, when the determining means determines that the optical disc needs to be finalized, the display control means controls the display of a message representing that the optical disc can be finalized.

4. A recording apparatus according to claim 1, wherein the determining means, determines based on the information of the type of the optical disc and the information of the recording format of the optical disc, whether or not the type of the optical disc and the recording format correspond to one of predetermined combinations.

5. The recording apparatus according to claim 1, wherein a first portion of the determining means determines whether or not the type of the optical disc is one of DVD-R, DVD-RW, and DVD+RW.

6. The recording apparatus according to claim 4, wherein a second portion of the determining means determines whether or not one of the predetermined combinations is one of a combination of DVD-R and DVD-Video format, a combination of DVD-RW and DVD-Video format, a combination of DVD-RW and DVD-VR format, and a combination of DVD+RW and DVD+RW Video format.

7. The recording apparatus according to claim 6, wherein, when the optical disc needs to be finalized and the recording format of the optical disc corresponds to one of the predetermined combinations, the display control the means controls display of a button for instructing the recording apparatus to execute the finalization.

8. The recording apparatus according to claim 7, wherein the finalization is one of session closing and border closing.

9. A recording method for recording data on an optical disc, comprising:
    acquiring information from the optical disc, the information including at least information of a type of the optical disc, information of a recording format of the optical disc, and information indicating whether or not the optical disc has already been finalized;
    determining whether or not the optical disc needs to be finalized, wherein the determination is based on matching (i) the type of the optical disc, (ii) the information of a recording format of the optical disc, and (iii) the information indicating whether or not the optical disc has already been finalized to one or more patterns; and
    controlling a display of a message based on the result of the determination.

10. A recording medium having a computer-readable program for performing, when executed by a processor, a method comprising:
    acquiring information from the optical disc, the information including at least information of a type of the optical disc, information of a recording format of the optical disc, and information indicating whether or not the optical disc has already been finalized;
    determining whether or not the optical disc needs to be finalized, wherein the determination is based on matching (i) the type of the optical disc, (ii) the information of a recording format of the optical disc, and (iii) the information indicating whether or not the optical disc has already been finalized to one or more patterns; and
    controlling a display of a message based on the result of the determination.

11. A recording apparatus for recording data on an optical disc, comprising:
    an acquiring unit configured to acquire information from the optical disc, the information including at least information of a type of the optical disc, information of a recording format of the optical disc, and information indicating whether or not the optical disc has already been finalized;
    a determining unit configured to determine whether or not the optical disc needs to be finalized, wherein the determination is based on matching (i) the type of the optical disc, (ii) the information of a recording format of the optical disc, and (iii) the information indicating whether or not the optical disc has already been finalized to one or more patterns; and
    a display control unit configured to control the display of a message based on the result of the determination by the determining unit.

* * * * *